United States Patent
Tjhang et al.

(10) Patent No.: US 9,719,342 B2
(45) Date of Patent: Aug. 1, 2017

(54) DRILL BIT ASSEMBLY IMAGING SYSTEMS AND METHODS

(71) Applicants: Schlumberger Technology Corporation, Sugar Land, TX (US); The University of Tokyo, Bunkyo-ku (JP)

(72) Inventors: Theodorus Tjhang, Sagamihara (JP); Masatoshi Ishikawa, Kashiwa (JP)

(73) Assignees: SCHLUMBERGER TECHNOLOGY CORPORATION, Sugar Land, TX (US); THE UNIVERSITY OF TOKYO (JP)

( * ) Notice: Subject to any disclaimer, the term of this patent is extended or adjusted under 35 U.S.C. 154(b) by 187 days.

(21) Appl. No.: 14/038,736

(22) Filed: Sep. 26, 2013

(65) Prior Publication Data
US 2015/0085101 A1    Mar. 26, 2015

(51) Int. Cl.
E21B 47/00 (2012.01)
H04N 5/225 (2006.01)
E21B 47/01 (2012.01)

(52) U.S. Cl.
CPC .......... *E21B 47/0002* (2013.01); *E21B 47/01* (2013.01); *H04N 5/2251* (2013.01); *H04N 5/2252* (2013.01); *H04N 2005/2255* (2013.01)

(58) Field of Classification Search
CPC .............................. E21B 47/04; E21B 10/18
See application file for complete search history.

(56) References Cited

U.S. PATENT DOCUMENTS

| | | | |
|---|---|---|---|
| 4,750,573 A * | 6/1988 | Wynn | E21B 10/18 175/337 |
| 5,410,391 A | 4/1995 | Imabayashi et al. | |
| 5,663,559 A * | 9/1997 | Auzerais | E21B 47/0002 250/256 |
| 6,002,430 A * | 12/1999 | McCall | H04N 5/23238 348/143 |
| 6,057,784 A | 5/2000 | Schaaf et al. | |
| 7,675,029 B2 | 3/2010 | Ramstad et al. | |
| 8,483,445 B2 | 7/2013 | Tjhang et al. | |
| 8,916,816 B2 | 12/2014 | Tjhang et al. | |
| 2007/0035736 A1 | 2/2007 | Vannuffelen et al. | |

(Continued)

FOREIGN PATENT DOCUMENTS

| WO | 2012/166138 | 12/2012 |
|---|---|---|
| WO | 2012166138 A1 | 12/2012 |
| WO | 20130020130 | 12/2012 |

OTHER PUBLICATIONS

Komuro et al., "High-S/N Imaging of a Moving Object using a High-frame-rate Camera," 2008 IEEE International Conference on Image Processing (ICIP 2008) (San Diego, Oct. 13, 2008), pp. 517-520.

(Continued)

*Primary Examiner* — Obafemi Sosanya

(57) ABSTRACT

Drill bit assembly imaging systems and methods are disclosed herein. An example method disclosed herein includes directing light conveying an image of a target through a portion of a drill bit assembly and capturing the image via an image sensor disposed inside the drill bit assembly. The example method also include determining drilling information based on the image via an image processor disposed inside the drill bit assembly.

14 Claims, 8 Drawing Sheets

(56) References Cited

U.S. PATENT DOCUMENTS

| | | | |
|---|---|---|---|
| 2009/0030616 A1* | 1/2009 | Sugiura | G01V 11/00 |
| | | | 702/9 |
| 2010/0118657 A1 | 5/2010 | Trinh et al. | |
| 2011/0058023 A1* | 3/2011 | Boles | G01B 11/2513 |
| | | | 348/46 |
| 2012/0076364 A1* | 3/2012 | Tjhang | E21B 47/102 |
| | | | 382/109 |
| 2013/0020130 A1 | 1/2013 | Trinh et al. | |
| 2013/0265409 A1 | 10/2013 | Tjhang et al. | |
| 2015/0167447 A1 | 6/2015 | Tjhang et al. | |

OTHER PUBLICATIONS

International search report and written opinion for the equivalent PCT patent application No. PCT/US2014/057673 issued on Jan. 8, 2015.

International Preliminary Report on Patentability issued in corresponding International application PCT/US2014/057673 on Apr. 7, 2016.

Ishikawa Watanabe Laboratory at The University of Tokyo. Website containing information relating to image processing technique of high-speed vision. http://www.k2.t.u-tokyo.ac.jp/index-e.html.

\* cited by examiner

DRILL BIT ASSEMBLY IMAGING SYSTEMS AND METHODS

FIELD OF THE DISCLOSURE

This disclosure relates generally to drilling applications and, more particularly, to drill bit assembly imaging systems and methods.

BACKGROUND

A downhole drilling tool is often used to drill boreholes to locate and/or produce hydrocarbons. During drilling, information related to a subterranean formation and/or fluids produced via the subterranean formation may assist an operator of the downhole drilling tool. For example, the operator may adjust a trajectory and/or a speed of a drill bit of the downhole drilling tool based on a geological property of the subterranean formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An example apparatus disclosed herein includes a drill bit assembly. The example apparatus also includes an image sensor and an image conduit disposed in the drill bit assembly. The image conduit is to direct light conveying an image to the image sensor. The example apparatus further includes an image processor disposed in the drill bit assembly. The image processor is to process the image to determine information related to a target in the image.

An example method disclosed herein includes directing an image of a target through a portion of a drill bit assembly and capturing the image via an image sensor disposed inside the drill bit assembly. The example method also include determining drilling information based on the image via an image processor disposed inside the drill bit assembly.

Another example apparatus disclosed herein includes a drill bit assembly operatively coupled to a downhole tool. The drill bit assembly includes an image conduit, an image sensor and an image processor. The image sensor is to capture an image of a target via the image conduit, and the image processor is to determine target information based on the image.

BRIEF DESCRIPTION OF THE DRAWINGS

Example embodiments of example drill bit assembly imaging systems and methods are described with reference to the following figures. The same numbers are used throughout the figures to reference like features and components.

DETAILED DESCRIPTION

Figure 1:
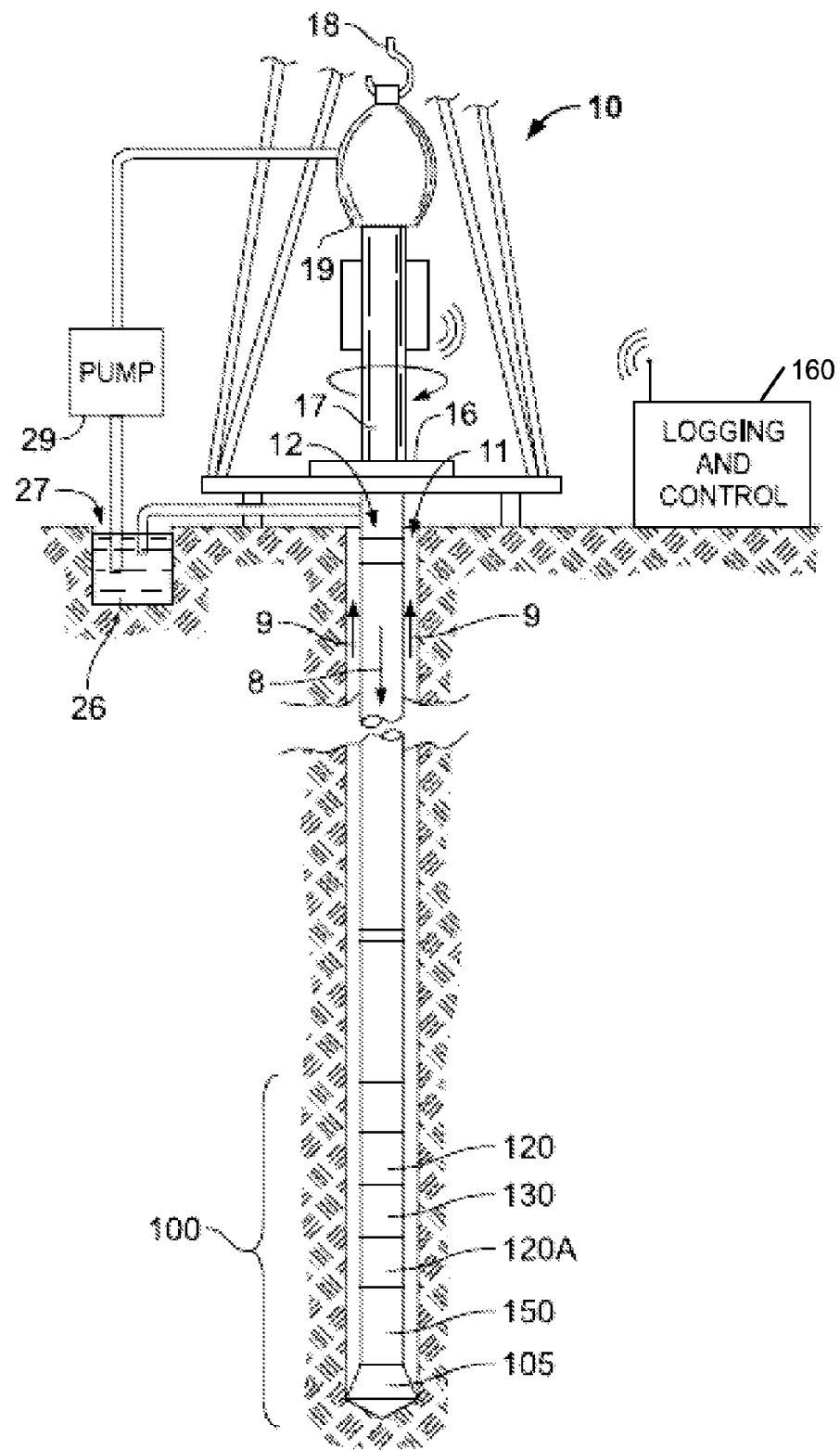
FIG. 1 illustrates an example system in which example embodiments of drill bit assembly imaging systems and methods can be implemented.

It is to be understood that the following disclosure provides many different examples for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various examples and/or configurations discussed. Moreover, the formation of a first feature over or on a second feature in the description that follows may include examples in which the first and second features are formed in direct contact, and may also include examples in which additional features may be formed interposing the first and second features such that the first and second features may not be in direct contact.

Drill bit assembly imaging systems and methods are disclosed herein. An example drill bit assembly includes a drill bit and an extension. The extension operatively couples the drill bit to a downhole tool. An example imaging system disclosed herein is disposed in the example drill bit assembly to capture images of targets inside and/or outside the drill bit assembly and to process the images downhole in the drill bit assembly during drilling. For example, the imaging system may determine target information. Target information is information related to one or more targets in one or more of the images. In some examples, the target information includes a size, a trajectory, a color, a texture, a shape, and/or any other information related to the target(s). In some examples, based on the target information, the imaging system determines drilling information. Drilling information is information related to a drilling operation. Drilling information may include, for example, a state and/or condition of a component of the drill bit assembly, penetration of a gas zone by the drill bit, a change in a geological property of a subterranean formation through which the drill bit assembly is drilling, and/or any other information related to the drilling operation. By processing the images downhole, the target information and/or the drilling information may be communicated uphole to a receiver in real time via a low bandwidth, wireless telemetry link.

The example imaging system may include an example image conduit in optical communication with an example image sensor. In some examples, the image sensor captures images at a high frame rate such as, for example, a frame rate of about 1000 frames per second. The example imaging system may also include an example image processor disposed in the drill bit assembly to process the images captured by the image sensor. In some examples, the image processor combines a plurality of images captured by the image sensor to generate one or more processed images having less or substantially no blur relative to the images captured by the image sensor. Based on the processed image(s), the image processor may determine the target information and/or the drilling information.

FIG. 1 illustrates an example wellsite system in which the examples disclosed herein can be employed. The wellsite can be onshore or offshore. In this example system, a borehole 11 is formed in subsurface formations by rotary drilling in any appropriate manner. Examples can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole or wellbore 11, the assembly 10 including a rotary table 16, a kelly 17, a hook 18 and a rotary swivel 19. The drill string 12 is rotated by the rotary table 16, energized by means not shown, which engages the kelly 17 at the upper end of the drill string 12. The drill string 12 is suspended from the hook 18, attached to a traveling block (also not shown), through the kelly 17 and the rotary swivel 19, which permits rotation of the drill string 12 relative to the hook 18. In some examples, a top drive system could be used.

In the illustrated example, the surface system further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annulus region between the outside of the drill string 12 and the wall of the borehole 11, as indicated by the directional arrows 9. In this manner, the drilling fluid 26 lubricates the drill bit 105 and carries formation cuttings up to the surface as it is returned to the pit 27 for recirculation.

The bottom hole assembly 100 of the illustrated example includes a logging-while-drilling (LWD) module 120, one or more measuring-while-drilling (MWD) modules 130, a rotosteerable system and a motor, and the drill bit 105.

The example LWD module 120 is housed in a special type of drill collar and can contain one or a plurality of types of logging tools. It will also be understood that more than one LWD and/or MWD module can be employed, for example, as represented at 120A. References throughout to a module at the position of 120 can mean a module at the position of 120A as well. The LWD module 120 includes capabilities for measuring (e.g., information acquiring devices), processing, and storing information (e.g., an information storage device such as, for example, nonvolatile memory), as well as for communicating with the surface equipment such as for example, a logging and control unit 160.

The example MWD module 130 is also housed in a special type of drill collar and can contain one or more devices for measuring characteristics of the drill string 12 and the drill bit 105. The MWD tool further includes an apparatus (not shown) for generating electrical power to the downhole system. This may include a mud turbine generator powered by the flow of the drilling fluid 26 and/or other power and/or battery systems. In some examples, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 2:
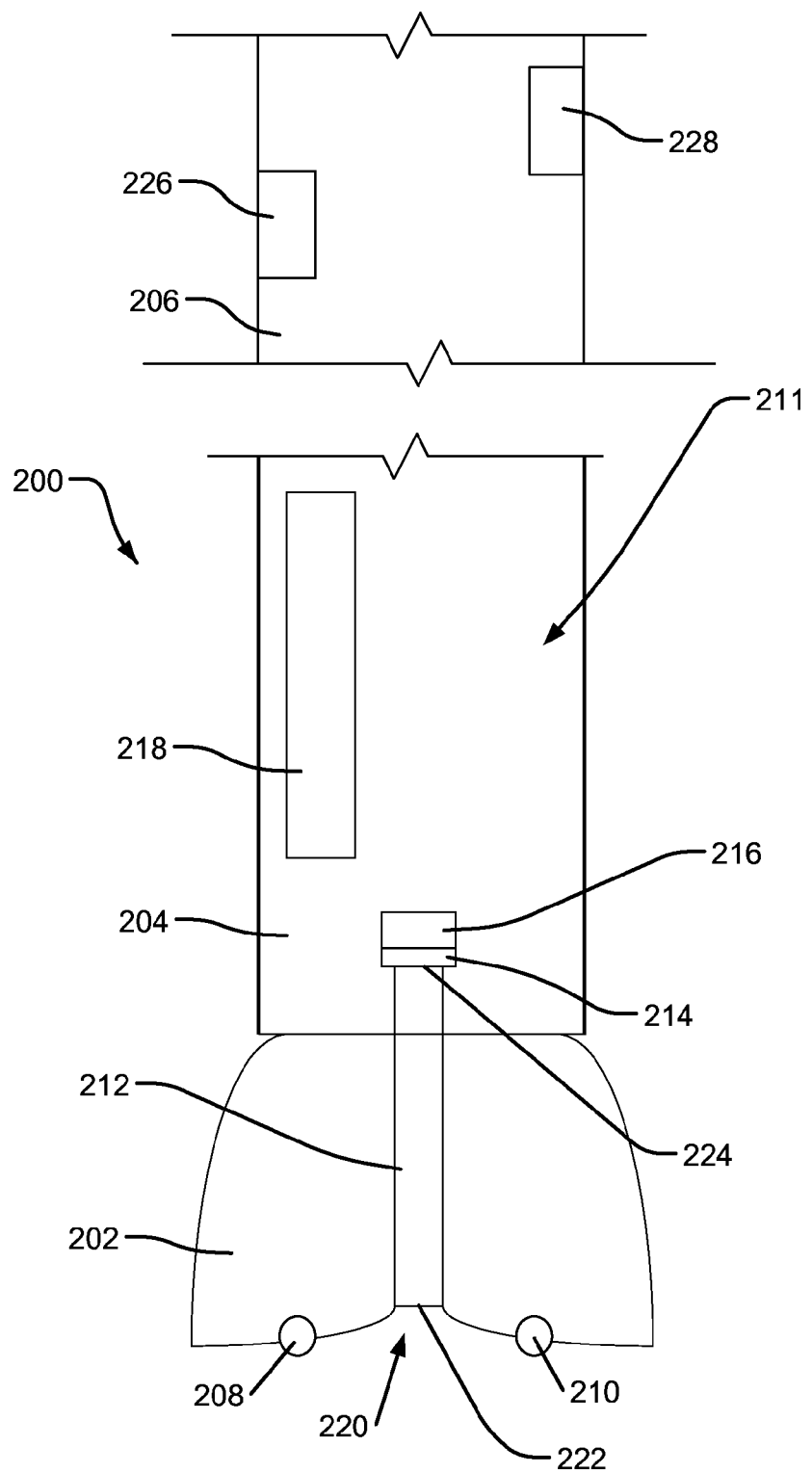
FIG. 2 illustrates various components of a first example device that can implement example embodiments of drill bit assembly imaging systems and methods.

FIG. 2 is a schematic of an example drill bit assembly 200 disclosed herein, which may be used to implement the example LWD tool 120 of FIG. 1. The example drill bit assembly 200 of FIG. 2 includes a drill bit 202 and an extension 204. In the illustrated example, the extension 204 operatively couples the drill bit 202 to a downhole tool 206 such as, for example, the measuring-while-drilling (MWD) tool 130 of FIG. 1. The example drill bit assembly 200 may be used to drill a borehole and/or penetrate a subterranean formation. For example, a motor (not shown) operatively coupled to the drill bit assembly 200 may drive the drill bit 202 via a drive shaft (not shown). In some examples, drilling fluid is flowed into the borehole to lubricate the drill bit 202 and/or carry formation cuttings, debris, and/or fluid toward a surface of Earth. In some examples, the drilling fluid is flowed through the downhole tool 206 and exits the drill bit 202 via ports 208, 210. In other examples, the drilling fluid is flowed through the downhole tool 206 and exits the downhole tool 206 via a drive shaft channel (not shown) disposed uphole of the drill bit assembly 200. In other examples, the drilling fluid is flowed into the borehole in other ways. In some examples, the downhole tool 206 and/or the drill bit assembly 202 of FIG. 2 is operated in a way described in U.S. Pat. No. 6,057,784, entitled "Apparatus and System for Making At-Bit Measurements While Drilling," filed Sep. 2, 1997, which is hereby incorporated by reference herein in its entirety.

During drilling, one or more drilling events may occur. For example, the drill bit 202 may penetrate a gas zone, the drill bit 202 may penetrate a layer of a subterranean formation, the drill bit 202 may move past a first portion of a subterranean formation having a first geological property to a second portion of the subterranean formation having a second geological property, a component of the drill bit assembly 200 may operate (e.g., a valve may open or close, a turbine may rotate, a shaft may rotate, etc.) and/or one or more other drilling events or combinations of events may occur.

The example drill bit assembly 200 of FIG. 2 includes an example imaging system 211 to detect and/or monitor drilling events. In the illustrated example, the imaging system 211 includes an example image conduit 212, an example image sensor 214, an example image processor 216, and an example first transceiver 218. The example first transceiver 218 includes a transmitter and a receiver. In the illustrated example, the image conduit 212 substantially extends from an end or tip 220 of the drill bit 202 through the drill bit 202 and into the extension 204. In other examples, the image conduit 212 is disposed in and/or extends between other portions of the example drill bit assembly 200. Further, other examples include other numbers of image conduits (e.g., 2, 3, 4, etc.). Moreover, while the example image conduit 212 of FIG. 2 is substantially straight, the drill bit assembly 200 is implemented in other examples using one or more curved image conduits.

The example image conduit 212 of FIG. 2 is a fiber optic image conduit. In other examples, other image conduits such as, for example, lenses, filters, mirrors, and/or other image conduits are employed. A first end 222 of the example image conduit 212 of FIG. 2 is in optical communication with (e.g., has an optical field-of-view that includes) a target adjacent the tip 220 of the drill bit 202. In the illustrated example, the target may be formation fluid, cuttings, one or more bubbles, debris, a portion of a subterranean formation, and/or any other target. In some examples, an optical window is disposed between the first end 222 of the image conduit 212 and the target. In some examples, the optical window is a sapphire window. In some examples, the optical window isolates, insulates and/or protects the image conduit 212 from drilling fluid, debris, cuttings, formation fluid, downhole conditions (e.g., high temperatures and/or pressures), etc. In some examples, the optical window includes a coating to protect the optical window and/or repel oil, water and/or other fluids and/or debris. In other examples, the first end 222 of the image conduit 212 is in contact with the target. For example, the first end 222 may be in contact with formation fluid flowing in the borehole. In some examples, the first end 222 includes a coating to protect the first end 222 and/or repel oil, water, and/or other fluids and/or debris from the first end 222.

In the illustrated example, a second end 224 of the image conduit 212 is in optical communication with the image sensor 214. The example image conduit 212 conveys or directs light conveying images from the first end 222 of the image conduit 212 to the image sensor 214 via the second end 224. The example image sensor 214 captures the images at a high frame rate. For example, the image sensor 214 may capture the images at a frame rate of about 1000 frames per second. In other examples, the image sensor 214 captures the images at other frame rates. In some examples, the image sensor 214 is a video camera.

In some examples, flushing fluid is flowed through the ports 208, 210 to project the flushing fluid into a field-of-view of the image sensor 214. For example, the flushing fluid may be projected into an area of a borehole adjacent the drill bit assembly 200 such as, for example, at and/or near the first end 222 of the image conduit 212. In some examples, the flushing fluid is a clear or substantially transparent liquid or gel. Thus, by projecting the flushing fluid into the field-of-view of the image sensor 214, the field-of-view of the image sensor 214 is flushed of obstructions between the image sensor 214 and the target such as, for example, opaque fluids, debris, and/or other obstructions. As a result, the example image sensor 214 has an unobstructed field-of-view that includes the target. The example flushing fluid may also clean the target and/or the first end 222 of the image conduit 212. In some examples, the flushing fluid is flowed through the ports 208, 210 periodically or momentarily such as, for example, during a time when the image sensor 214 is capturing images. In some examples, the example drill bit assembly 200 uses flushing fluid as described in U.S. application Ser. No. 13/439,824, filed on Apr. 4, 2012, which is hereby incorporated by reference herein in its entirety.

During drilling, the drill bit assembly 200 moves relative to targets captured in the images. For example, if the target is a bubble, the bubble may flow past the first end 222 of the image conduit 212 and/or the drill bit assembly 200 may be rotating and/or vibrating as the images are captured. The example image processor 216 processes the images to increase a signal-to-noise ratio of the image sensor 214 and/or reduce, and/or minimize an effect of motion parallax such as blurring of the images. In the illustrated example, the image processor 216 combines images to generate a processed image having less or substantially no blur relative to the images captured by the image sensor 214. In some examples, the image processor 216 performs motion and/or depth estimation of the target to generate the processed image. An example image processing technique which may be implemented by the example image processor 216 of FIG. 2 is described in Komuro et al., *High-S/N Imaging of a Moving Object using a High-frame-rate Camera*, 2008 IEEE International Conference on Image Processing (ICIP 2008) (San Diego, Oct. 13, 2008), pp. 517-520, which is hereby incorporated by reference herein in its entirety.

For example, noise of the image sensor 214 may include fixed-pattern noise, random noise, shot noise and/or quantization noise. Assuming that quantization noise is negligible and/or is included in random noise and/or shot noise, a luminance value L(x, y, t) at pixel (x, y) of the image sensor 214 in frame t may be presented by Equation 1 below:

$$L(x,y,t) = \alpha I(x,y,t)T_e + n_f(x,y) + n_r(x,y,t), \quad (1)$$

In equation 1, I(x, y, t) is a light intensity incident on the pixel (x, y) in frame t, $T_e$ is an exposure time, $n_f$ is fixed pattern noise and $n_r$ is random noise in the combined image. If luminance does not vary after movement, a relationship can be written as shown in Equation 2:

$$I(u(x,y,t),v(x,y,t),t) = I(x,y,t_0). \quad (2)$$

A combined image of F frames $\hat{L}(x, y)$ is given by Equations 3-4:

$$\hat{L}(x, y) = \frac{1}{F}\sum_{t=t_0}^{t_0+F} L(u, v, t) \quad (3)$$

$$= \alpha I(x, y, t_0)T_e + \frac{1}{F}\sum_{t=t_0}^{t_0+F}(n_f(u, v) + n_r(u, v, t)). \quad (4)$$

If an average of each of the fixed-pattern noise, random noise, shot noise and/or quantization noise is zero, a variance of random noise in the combined image is reduced to 1/F by combining images. Fixed-pattern noise may be minimized by preprocessing and/or is reduced in proportion to a reciprocal of a square root of a number of pixels a target moves through.

If the target is a single plane, movement of the target may be estimated by feature point tracking and/or template matching. If the target is a three dimensional object, a motion map and a depth map may be determined substantially simultaneously. If initial values of the depth map are given, iteration processing may be used to estimate the motion and the depth map of the target alternately via estimation by template matching. In some examples, estimation of motion p(t) of the target and the depth map Z(x, y) is determined in terms of an optimization problem that minimizes the following equation:

$$J = \sum_{t}\sum_{x,y}\left(\frac{1}{F}\sum_{t'}L(u, v, t') - L(u, v, t)\right)^2. \quad (5)$$

If the target is assumed to be rigid, the motion of the target is expressed by the following parameters, including three rotation angles and three translational distances:

$$p(t) = (\theta_x(t), \theta_y(t), \theta_z(t), t_x(t), t_y(t), t_z(t)). \quad (6)$$

If $p(t_0)=0$ in a first frame, a three dimensional position (X, Y, Z) of image coordinates (x, y) satisfies the following equations:

$$X(x,y) = xZ(x,y)/f \quad (7)$$

$$Y(x,y) = yZ(x,y)/f \quad (8)$$

In Equations 7 and 8, f is a focal length. Using Equations 7 and 8, image coordinates u(x, y, t), v(x, y, t) in frame t corresponding to image coordinates (x, y) in the first frame are determined as follows:

$$u(x, y; p(t), Z(x, y)) = f \frac{(r_{11}(t)x/f + r_{12}(t)y/f + r_{13}(t))Z(x, y) + t_x(t)}{(r_{31}(t)x/f + r_{32}(t)y/f + r_{33}(t))Z(x, y) + t_z(t)} \quad (9)$$

$$v(x, y; p(t), Z(x, y)) = f \frac{(r_{21}(t)x/f + r_{22}(t)y/f + r_{23}(t))Z(x, y) + t_y(t)}{(r_{31}(t)x/f + r_{32}(t)y/f + r_{33}(t))Z(x, y) + t_z(t)}, \quad (10)$$

In Equations 9 and 10, $r_{ij}$ are elements of a rotation matrix derived from $\theta_x$, $\theta_y$, $\theta_z$. The following algorithm flow is then used:

1) Initialize the following variables:

$$L(x,y) = L(x,y,1), Z(x,y) = Z_0,$$

2) Obtain p(t) that minimizes the following equation:

$$J = \sum_t \sum_{x,y} \left(\hat{L}(x, y) - L(u, v, t)\right)^2. \quad (11)$$

3) Obtain Z(x, y) that minimizes Equation 5;
4) Update $\hat{L}(x, y)$ using the following equation:

$$\hat{L}(x, y) = \frac{1}{F} \sum_t L(u, v, t). \quad (12)$$

5) Iterate 2)-4) of the algorithm flow a plurality of times.

For motion estimation, p(t) that minimizes J in Equation 11 is equal to p(t) that minimizes Equation 13 below because p(t) is involved in a partial sum for the frame t in Equation 11.

$$J_t = \sum_{x,y} \left(\hat{L}(x, y) - L(u, v, t)\right)^2. \quad (13)$$

In some examples, a solution to Equation 13 is determined using an iterative calculation shown in Equations 14-18 below in which a Lucas-Kanade method is applied to a perspective projection model.

$$p^{(k+1)}(t) = p^{(k)}(t) + \Delta p^{(k)}(t) \quad (14)$$

$$\Delta p^{(k)}(t) = \left(\sum_{x,y} A^T A\right)^{-1} \sum_{x,y} Ab \quad (15)$$

$$A = \nabla L(x, y, t) \frac{\partial W(x, y; p^{(k)}(t))}{\partial p} \quad (16)$$

-continued $$b = L(x, y) - L(W(x, y; p^{(k)}(t)), t) \quad (17)$$

$$W(x, y; p(t)) = (u(x, y; p(t)), v(x, y, p(t))). \quad (18)$$

For depth estimation, Z(x, y) that minimizes J in Equation 5 is equal to Z(x, y) that minimizes Equation 19 below and can be calculated for each (x, y):

$$J_{x,y} = \sum_t \left(\frac{1}{F} \sum_{t'} L(u, v, t') - L(u, v, t)\right)^2 \quad (19)$$

This is a one-dimensional search. By using information of a plurality of frames in this manner, the depth may be estimated. In some examples, $J_{x,y}$ is smoothed via a Gaussian filter before searching for Z(x, y) that minimizes $J_{x,y}$. In some examples, the depth map is smoothed for each iteration.

The example image processor 216 of FIG. 2 determines target information based on the sensed images and/or the processed image(s). In some examples, the image processor 216 determines target information such as, for example, object boundary information, a trajectory of the target, a shape of the target, a number of targets in the images and/or the processed image(s), a color of the target, a texture of the target, and/or other target information. In some examples, the image processor 216 is used to implement image-based downhole fluid analysis such as, for example, the image-based downhole fluid analysis implemented in U.S. Pat. No. 8,483,445, filed on Sep. 26, 2011, which is hereby incorporated by reference herein in its entirety.

In some examples, the image processor 216 analyzes and/or processes the target information to determine and/or detect a drilling event such as, for example, penetration of a gas zone, penetration of a layer of a subterranean formation, a change in a geological property of a subterranean formation through which the drill bit 202 is drilling, and/or any other drilling event. In some examples, the image processor 216 generates drilling information including a determination of the drilling event based on the target information. The example image processor 216 can, for example, compress, encrypt, modulate and/or filter the target information and/or the drilling information to format the target information and/or the drilling information. In some examples, formatted target information and/or formatted drilling information is communicated from the drill bit assembly 200 via the first transceiver 218 to a second transceiver 226 of the downhole tool 206, and the formatted target information and/or the formatted drilling information is reported via a telemetry link 228 toward a surface of Earth. The example telemetry link 228 may be a modem or a low bandwidth telemetry link such as, for example, a mud-pulse telemetry link. Because the example image processor 216 processes the images downhole to determine the target information and/or the drilling information, which can include less data than the original image, the target information and/or the drilling information is communicated uphole to the surface of Earth via the telemetry link 228 in real-time. As a result, the example imaging system 211 enables an operator of the example downhole tool 206 to quickly and timely respond to the event. For example, based on the drilling information, the operator may adjust a speed of rotation of the drill bit 202, a trajectory of the drill bit 202, etc.

In the illustrated example, the first transceiver 218 and the second transceiver 226 enable communication between the example drill bit assembly 200 and the example downhole tool 206. Thus, information may be communicated from the downhole tool 206 to the drill bit assembly 200. In some examples, information from the surface is communicated to the drill bit assembly 200 in real time via the telemetry link 228, the second transceiver 226 and the first transceiver 218.

Figure 3:
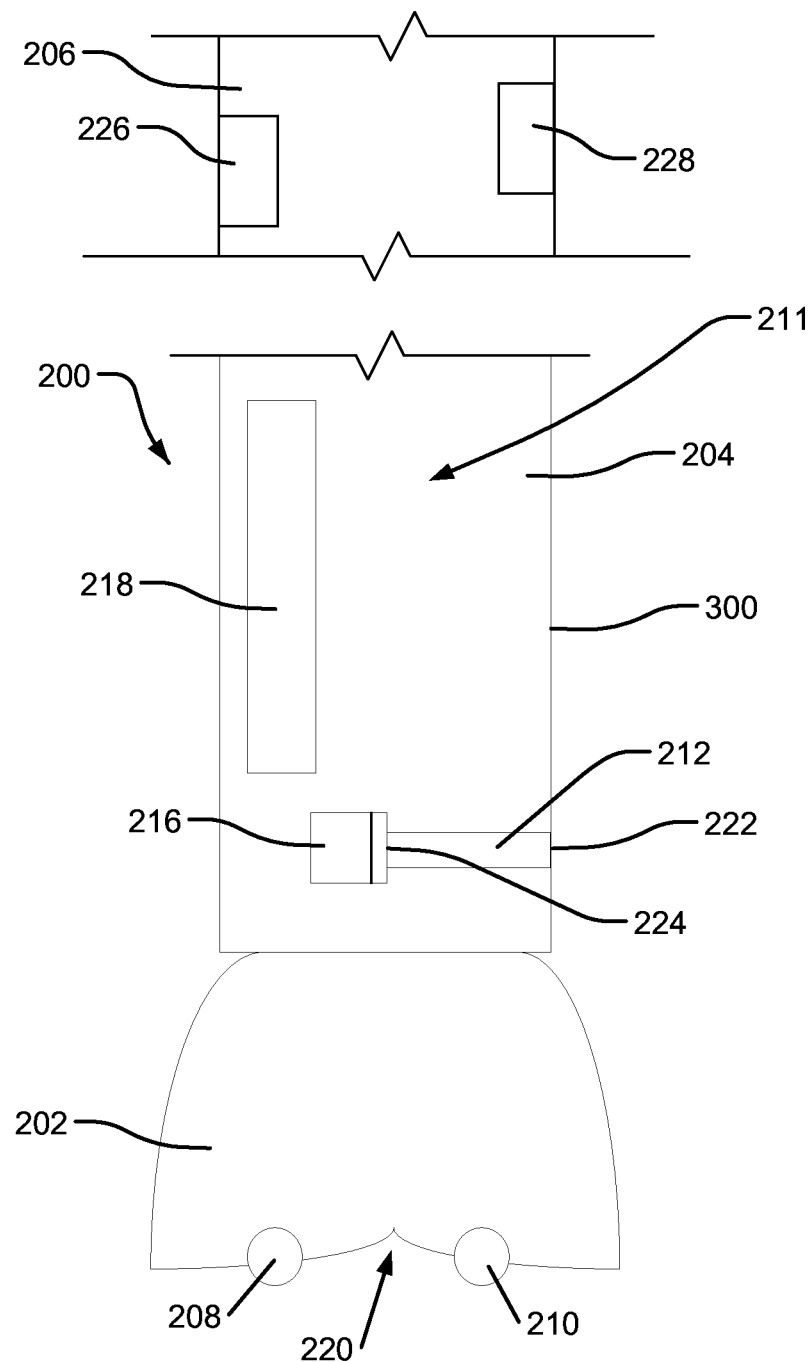
FIG. 3 illustrates various components of a second example device that can implement example embodiments of drill bit assembly imaging systems and methods.

FIG. 3 illustrates the example drill bit assembly 200 of FIG. 2 having the image conduit 212 extending from inside the extension 204 to a side 300 of the extension 204. Thus, the example image conduit 212 of FIG. 3 may be used to capture images of targets adjacent the extension 204 such as, for example, a penetrated portion of a subterranean formation, formation fluid, cuttings, drilling fluid and/or any other target.

Figure 4:
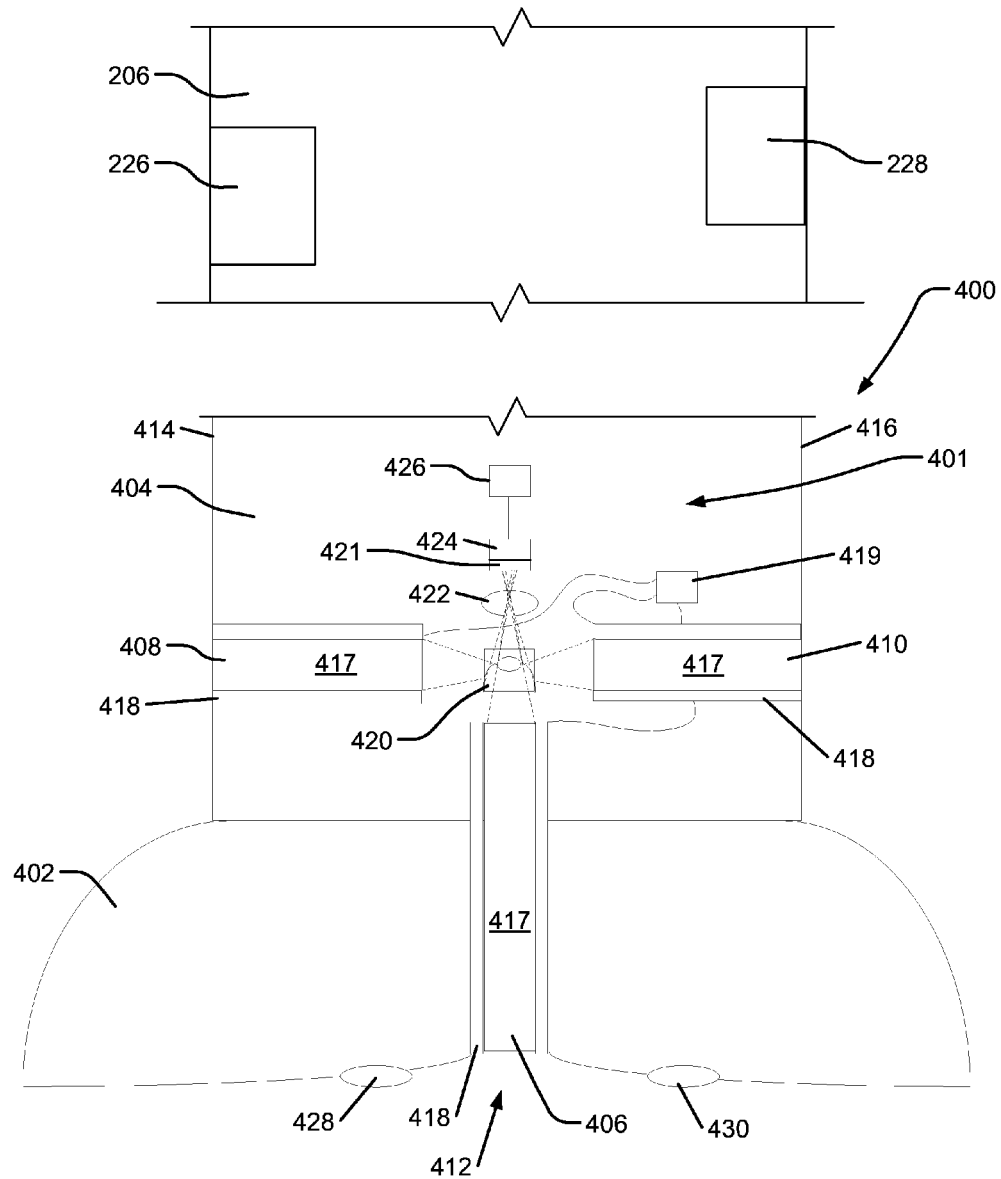
FIG. 4 illustrates various components of a third example device that can implement example embodiments of drill bit assembly imaging systems and methods.

FIG. 4 is a schematic of the example downhole tool 206 including an example drill bit assembly 400 having another example imaging system 401 disclosed herein. The example drill bit assembly 400 of FIG. 4 includes a drill bit 402 and an extension 404. In the illustrated example, the imaging system 401 includes a first example image conduit 406, a second example image conduit 408 and a third example image conduit 410. Other examples have other numbers of image conduits. In the illustrated example, the first image conduit 406 extends from the extension 404 to an end or tip 412 of the drill bit 402. The example second image conduit 408 is disposed in the extension 404 and extends to a first side 414 of the extension 404. The example third image conduit 410 is disposed in the extension 404 and extends to a second side 416 of the extension 404.

In the illustrated example, each of the first image conduit 406, the second image conduit 408 and the third image conduit 410 includes an example imaging fiber bundle 417 and an example illumination fiber bundle 418. The example imaging fiber bundles 417 enable images to be conveyed along lengths of the respective image conduits 406, 408, 410. The example illumination fiber bundles 418 are disposed adjacent the imaging fiber bundles 417. In some examples, the illumination fiber bundles 418 substantially surround the imaging fiber bundles 417. In the illustrated example, the illumination fiber bundles 418 convey light generated from a light source 419 to, for example, illuminate areas adjacent the drill bit assembly 400.

In the illustrated example, each of the first image conduit 406, the second image conduit 408 and the third image conduit 410 direct the images to an example hemispherical mirror 420 disposed in the extension 404. The example hemispherical mirror 420 of FIG. 4 reflects the images to an example image sensor 421 via a lens 422 disposed between the hemispherical mirror 420 and the image sensor 421. Thus, in the illustrated example, the example image sensor 421 captures images of targets disposed in a plurality of positions or areas relative to the drill bit assembly 400 via the first image conduit 406, the second image conduit 408 and the third image conduit 410. In the illustrated example, the image sensor 421 captures the images at a high frame rate.

The example drill bit assembly 400 of FIG. 4 includes an example image processor 424 to process and/or analyze the images captured by the example image sensor 421. In some examples, the image processor 424 processes the images to increase a signal-to-noise ratio of the image sensor 421 and/or reduce, and/or minimize an effect of motion parallax such as blurring of the images. In the illustrated example, the image processor 424 combines images of each the targets to generate processed images having less or substantially no blur relative to the images captured by the image sensor 421. In some examples, the image processor 424 performs motion and/or depth estimation of the target to generate the processed image. An example image processing technique which may be implemented by the example image processor 424 of FIG. 4 is described in Komuro et al., *High-S/N Imaging of a Moving Object using a High-frame-rate Camera*, 2008 IEEE International Conference on Image Processing (ICIP 2008) (San Diego, Oct. 13, 2008), pp. 517-520, which is discussed above.

The example image processor 424 of FIG. 4 determines target information based on the sensed images and/or the processed image(s). In some examples, the image processor 424 determines object boundary information, trajectories of the targets, target shapes, numbers of targets, colors of the targets, textures of the targets, and/or other target information. In some examples, the image processor 424 determines target information by implementing image-based downhole fluid analysis such as, for example, the image-based downhole fluid analysis described in U.S. Pat. No. 8,483,445, filed on Sep. 26, 2011. For example, based on the images, the image processor 424 may characterize and/or identify formation fluids, quantify an amount of oil and/or water included in the formation fluids, and/or conduct other types of downhole fluid analyses. Other downhole fluid analysis techniques which may be implemented using the example image processor 424 are described in U.S. Publication No. 2007/0035736, filed on Aug. 15, 2005; U.S. Pat. No. 5,663,559, filed Jun. 7, 1995; U.S. Pat. No. 7,675,029, filed Aug. 26, 2004; and U.S. Pat. No. 5,410,391, filed Jun. 15, 1990. U.S. Publication No. 2007/0035736, U.S. Pat. No. 5,663,559, U.S. Pat. No. 7,675,029, and U.S. Pat. No. 5,410,391 are hereby incorporated herein by reference in their entireties.

In some examples, the image processor 424 analyzes and/or processes the target information to determine and/or detect a drilling event such as, for example, penetration of a gas zone, penetration of a layer of a subterranean formation, a change in a geological property of a subterranean formation through which the drill bit 402 is drilling, and/or any other drilling event. In some examples, if a drilling event is detected, the image processor 424 generates drilling information based on the target information. In some examples, the example image processor 424 formats the target information and/or the drilling information by compressing, encrypting, modulating and/or filtering the target information and/or the drilling information.

The target information and/or the drilling information is communicated from the example drill bit assembly 400 via a wireless transmitter 426 to the second transceiver 226 of the example downhole tool 206. In some examples, the wireless transmitter 426 is included in a transceiver disposed on the drill bit assembly 400. In the illustrated example, the target information and/or the drilling information is communicated from the downhole tool 206 toward a surface of earth via the telemetry link 228. In some examples, the telemetry link 228 implements a low bandwidth telemetry link such as, for example, a mud-pulse telemetry link. By processing the target information and/or the drilling information downhole in the example drill bit assembly 400, the target information may be communicated from example drill bit assembly 400 to the surface of Earth in real-time. As a result, an operator of the example drill bit assembly 400 may respond to the drilling information and/or the target information by, for example, by adjusting an operating parameter of the drill bit assembly 400 such as, for example, a speed of rotation of the drill bit 402, an angle of trajectory of the drill bit 402, etc.

In some examples, flushing fluid is flowed through ports 428, 430 to project the flushing fluid into a field-of-view of the image sensor 421. In some examples, the flushing fluid flushes away obstructions and/or cleans the targets, the first image conduit 406, the second image conduit 408 and/or the third image conduit 410. In some examples, the example drill bit assembly 400 implements techniques involving flushing fluid that are described in U.S. application Ser. No. 13/439,824, filed on Apr. 4, 2012.

Figure 5:
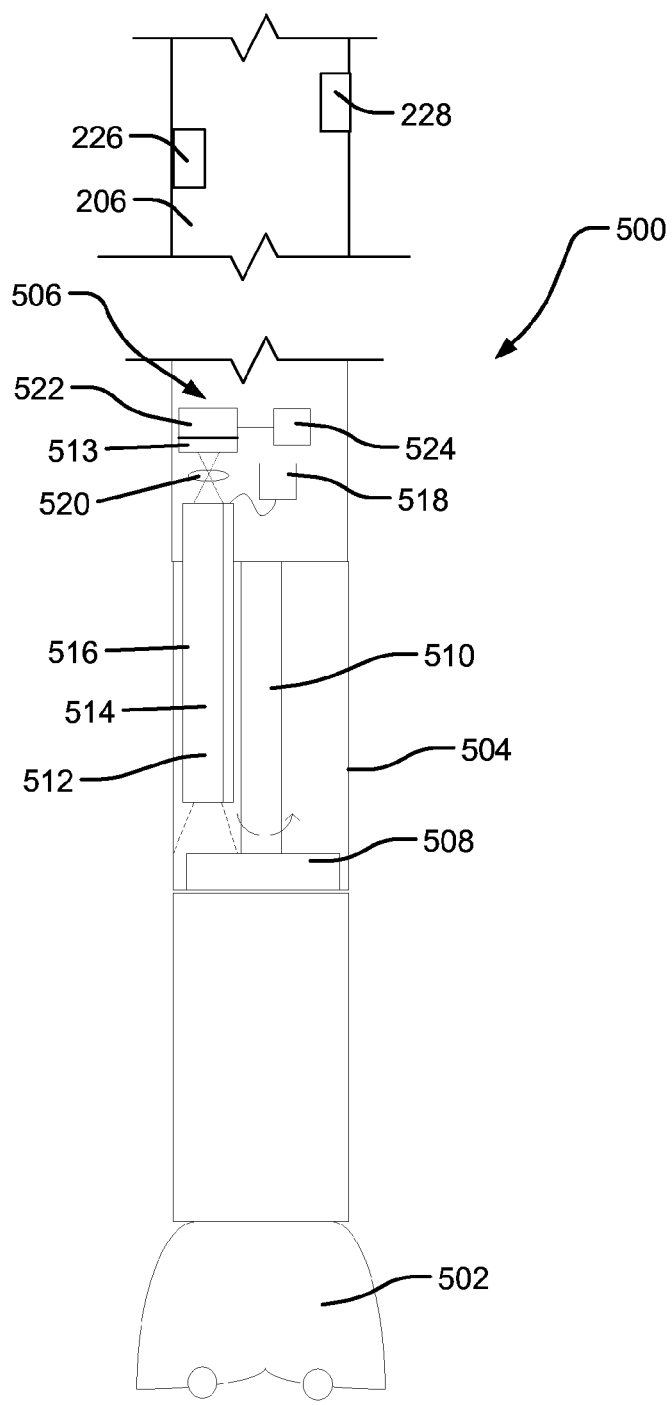
FIG. 5 illustrates various components of a fourth example device that can implement example embodiments of drill bit assembly imaging systems and methods.

FIG. 5 is a schematic of the example downhole tool 206 having another example drill bit assembly 500 disclosed herein. In the illustrated example, the drill bit assembly 500 includes a drill bit 502 and an extension 504. The example drill bit assembly 500 of FIG. 5 includes an example imaging system 506 that is used to detect and/or determine drilling information such as, for example, movement, a position and/or a condition of one or more components of the example drill bit assembly 500. In the illustrated example, the imaging system 506 is used to monitor a valve 508 operatively coupled to a shaft 510 disposed in the example extension 504. For example, the imaging system 506 may be used to detect a position of the valve 508, a state of wear and/or a condition of one or more components of the valve, and/or other information. Although the following examples are described in conjunction with the example valve 508 of FIG. 5, in other examples, the imaging system 506 is used to detect and/or monitor other components of the drill bit assembly 500.

The example imaging system 506 includes an image conduit 512 disposed between the valve 508 and an example image sensor 513. In the illustrated example, the image conduit 512 includes an example imaging fiber bundle 514 and an example illumination fiber bundle 516. The example illumination fiber bundle 516 is illuminated via an example light source 518 to illuminate a field of view including at least a portion of the example valve 508. In the illustrated example, the imaging fiber bundle 514 directs light conveyed images of the example valve 508 to the image sensor 513 via a lens 520.

The example imaging system 506 of FIG. 5 includes an example image processor 522 to process and/or analyze the images captured by the example image sensor 513. In some examples, the image processor 522 processes the images to increase a signal-to-noise ratio of the image sensor 513 and/or reduce and/or minimize an effect of motion parallax such as blurring of the images. For example, rotation of the valve 508 may cause an image of the valve 508 captured by the image sensor 513 to be blurred. In the illustrated example, the image processor 522 combines images to generate a processed image having less or substantially no blur relative to the images captured by the image sensor 513. In some examples, the image processor 522 performs motion and/or depth estimation of a target in the image (e.g., a portion of the valve 508) to generate the processed image. An example image processing technique which may be implemented by the example image processor 522 of FIG. 5 is described in Komuro et al., *High-S/N Imaging of a Moving Object using a High-frame-rate Camera*, 2008 IEEE International Conference on Image Processing (ICIP 2008) (San Diego, Oct. 13, 2008), pp. 517-520, which is discussed above.

The example image processor 522 of FIG. 5 determines target information based on the sensed images and/or the processed image(s). For example, the image processor 522 determines object boundary information, a shape of a target, a color of the target, a texture of the target, and/or other target information. In some examples, based on the target information, the image processor 522 determines drilling information such as, for example, movement of the valve 508, a position of the valve 508, a state of the valve (e.g., open or closed, operating, etc.), a condition of one or more components of the valve 508, and/or other drilling information. In some examples, the example image processor 522 formats the target information and/or the drilling information by compressing, encrypting, modulating and/or filtering the target information and/or the drilling information.

The target information and/or the drilling information is communicated to the example downhole tool 206 via a wireless transmitter 524. The target information and/or the drilling information is received by the second transceiver 226 and communicated to a surface of Earth via the telemetry link 228. In some examples, the telemetry link 228 is a low bandwidth telemetry link such as, for example, a mud-pulse telemetry link. By processing the target information and/or the drilling information downhole in the example drill bit assembly 500, the target information and/or the drilling information may be communicated to the surface of Earth in real-time. As a result, an operator of the example drill bit assembly 500 may determine if the example valve 508 is operating properly, if a component of the valve 508 is worn, etc.

Figure 6:
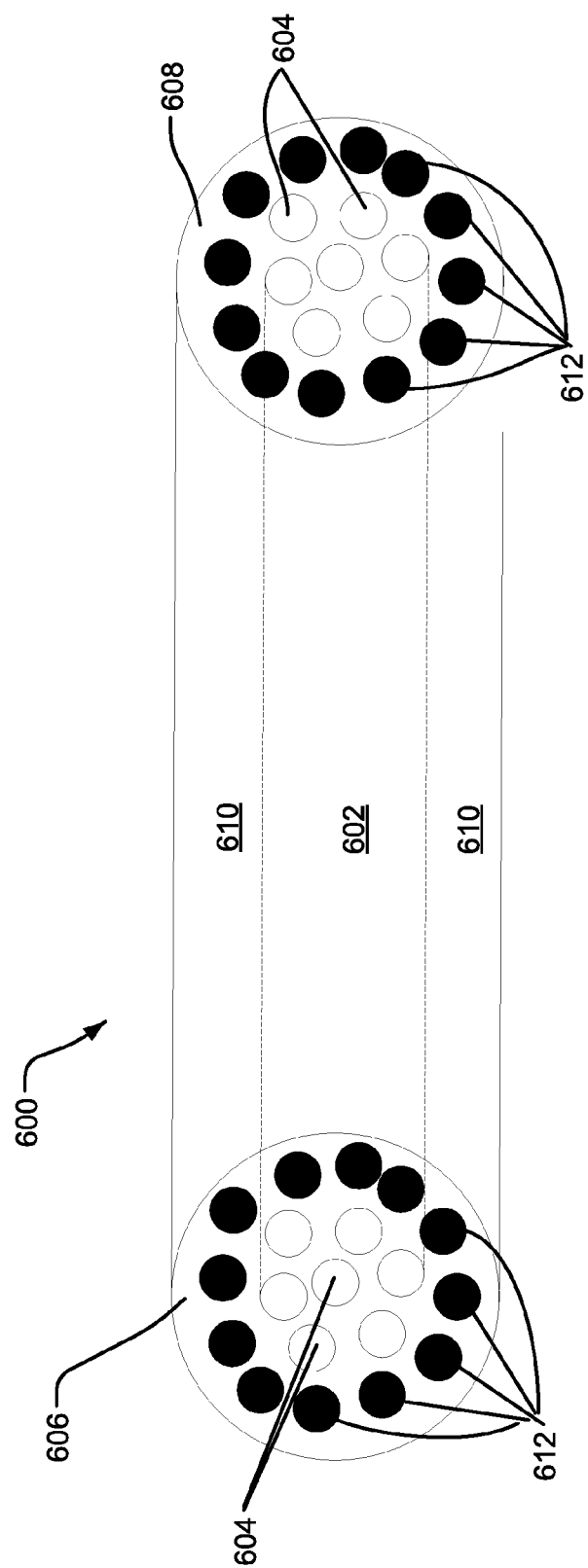
FIG. 6 illustrates various components of a fifth example device that can implement example embodiments of drill bit assembly imaging systems and methods.

FIG. 6 is a schematic of an example image conduit 600 disclosed herein, which may be used to implement the example image conduit 212 of FIGS. 2-3, the example first image conduit 406 of FIG. 4, the example second image conduit 408 of FIG. 4, the example third image conduit 410 of FIG. 4, and/or the example image conduit 512 of FIG. 5. In the illustrated example, the image conduit 600 includes an example imaging fiber bundle 602 having a plurality of imaging fibers 604. The example imaging fibers 604 convey images from a first end 606 to a second end 608 of the example image conduit 600.

The example image conduit 600 also includes an example illumination fiber bundle 610 having a plurality of illumination fibers 612. Light is conveyed to a field-of-view via the example illumination fibers 612. In the illustrated example, the illumination fibers 612 are disposed adjacent the imaging fiber bundle 602. In some examples, the illumination fibers 612 substantially surround the imaging fiber bundle 602. In some examples, the image conduit 600 is flexible and may be bent or curved during operation. In other examples, the image conduit 600 is rigid and/or substantially straight. Other example image conduits which may be used to implement the examples disclosed herein are described in U.S. patent application Ser. No. 13/654,408, filed on Oct. 17, 2012, which is hereby incorporated by reference herein in its entirety.

While example manners of implementing the example imaging system 211, the example imaging system 401, and the example imaging system 506 are illustrated in FIGS. 2-5, one or more of the elements, processes and/or devices illustrated in FIGS. 2-5 may be combined, divided, rearranged, omitted, and/or implemented in any other way. Further, the example image sensor 214, the example image processor 216, the example first transceiver 218, the example second transceiver 226, the example telemetry link 228, the example light source 419, the example image sensor 421, the example image processor 424, the example transmitter 426, the example image sensor 513, the example light source 518, the example image processor 522, the example transmitter 524 and/or, more generally, the example imaging system 211 of FIGS. 2 and 3, the example imaging system 401 of FIG. 4, and/or the example imaging system 506 of FIG. 5 may be implemented by hardware, software, firmware and/or any combination of hardware, software and/or firmware. Thus, for example, any of the example image sensor 214, the example image processor 216, the example first transceiver 218, the example second transceiver 226, the example telemetry link 228, the example light source 419, the example image sensor 421, the example image processor 424, the example transmitter 426, the example image sensor 513, the example light source 518, the example image processor 522, the example transmitter 524 and/or, more generally, the example imaging system 211 of FIGS. 2 and 3, the example imaging system 401 of FIG. 4, and/or the example imaging system 506 of FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example image sensor 214, the example image processor 216, the example first transceiver 218, the example second transceiver 226, the example telemetry link 228, the example light source 419, the example image sensor 421, the example image processor 424, the example transmitter 426, the example image sensor 513, the example light source 518, the example image processor 522, the example transmitter 524 and/or, more generally, the example imaging system 211 of FIGS. 2 and 3, the example imaging system 401 of FIG. 4, and/or the example imaging system 506 of FIG. 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example imaging system 211 of FIGS. 2 and 3, the example imaging system 401 of FIG. 4, and/or the example imaging system 506 of FIG. 5 may include one or more elements, processes and/or devices in addition to, or instead of, those illustrated in FIGS. 2-5, and/or may include more than one of any of the illustrated elements, processes and devices.

Figure 7:
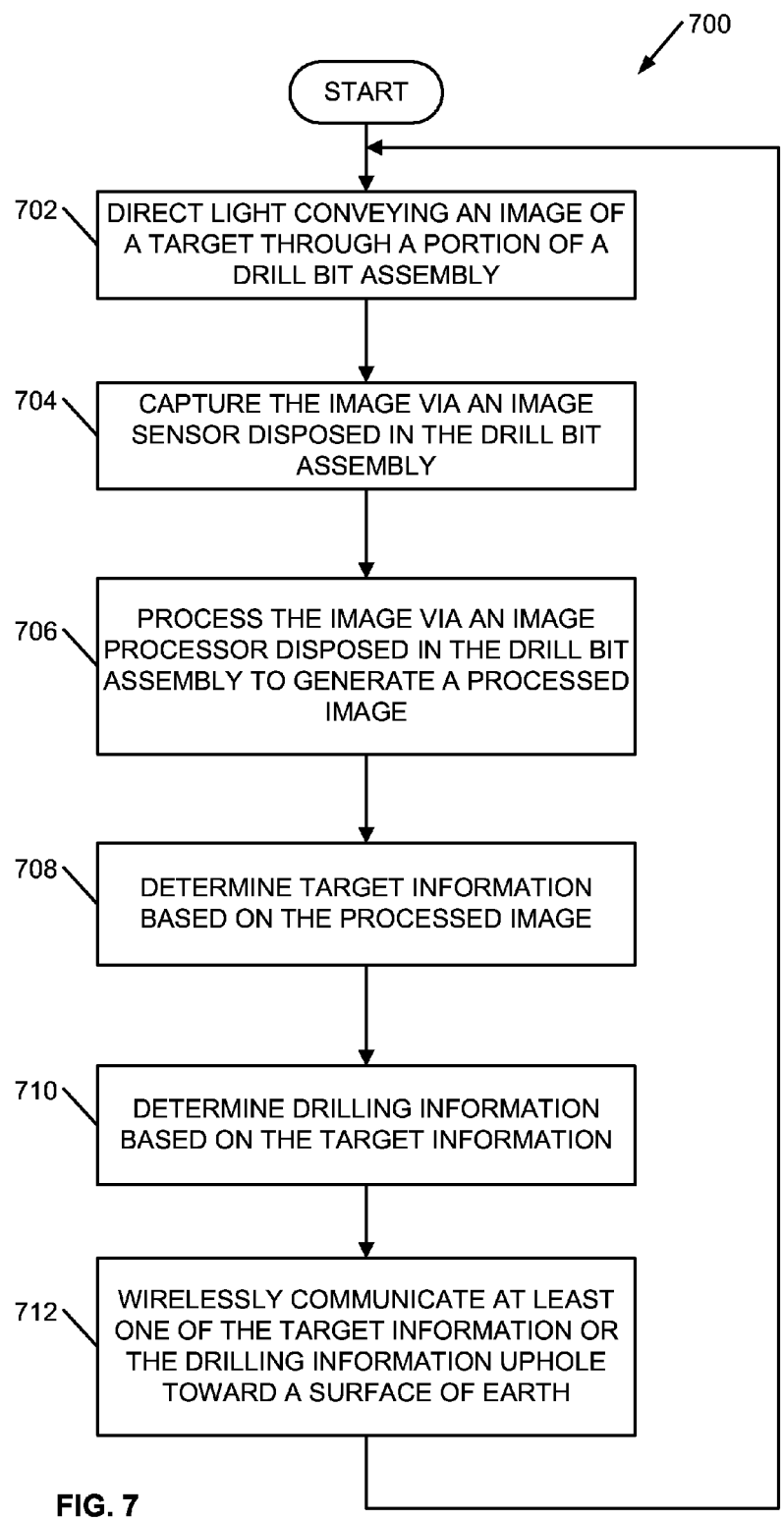
FIG. 7 illustrates example method(s) in accordance with one or more embodiments.

A flowchart representative of an example method that may be used to implement the example image sensor 214, the example image processor 216, the example first transceiver 218, the example second transceiver 226, the example telemetry link 228, the example light source 419, the example image sensor 421, the example image processor 424, the example transmitter 426, the example image sensor 513, the example light source 518, the example image processor 522, the example transmitter 524, the example imaging system 211 of FIGS. 2 and/or 3, the example imaging system 401 of FIG. 4, and/or the example imaging system 506 of FIG. 5 is shown in FIG. 7. The method may be implemented using machine readable instructions that comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could be executed by a device other than the processor 812 and/or embodied in firmware or dedicated hardware. Further, although the example program is described with reference to the flowchart illustrated in FIG. 7, many other methods of implementing the example image sensor 214, the example image processor 216, the example first transceiver 218, the example second transceiver 226 the example telemetry link 228, the example light source 419, the example image sensor 421, the example image processor 424, the example transmitter 426, the example image sensor 513, the example light source 518, the example image processor 522, the example transmitter 524, the example imaging system 211 of FIGS. 2 and/or 3, the example imaging system 401 of FIG. 4, and/or the example imaging system 506 of FIG. 5 may be used. For example, the order of execution of the blocks may be changed, and/or some of the blocks described may be changed, omitted, or combined.

As mentioned above, the example method of FIG. 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. The example method of FIG. 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The example method 700 of FIG. 7 begins at block 702 by directing light conveying an image of a target through a portion of a drill bit assembly. For example, the image conduit 212 of FIG. 2 may direct light conveying an image of a portion of a subterranean formation through the drill bit 202. In some examples, the image conduit 512 directs light conveying an image of a component of the drill bit assembly 500 through a portion of the drill bit 502 and/or the extension 504. At block 704, the image is captured via an image sensor disposed in the drill bit assembly. For example, the image sensor 214 may capture the image and/or a plurality of images of the subterranean formation at a high frame rate such as, for example, about 1000 frames per second. At block 706, the image is processed via an image processor disposed in the drill bit assembly to generate a processed image. For example, the image processor 216 may combine the image with a plurality of previously captured images to generate a processed image having less or substantially no blur relative to the images captured by the image sensor 214, thereby increasing a signal-to-noise ratio of the image sensor 214. In some examples, the image processor 216 estimates motion and/or depth of the target based on the images captured by the image sensor 214 to generate the processed image.

At block 708, target information is determined based on the processed image. The target information may include, for example, a color of the subterranean formation, a texture of the subterranean formation, and/or other information. In some examples, the target information includes object boundary information, a trajectory of the target, a size of the target, a shape of the target, and/or other target information.

At block 710, drilling information is determined based on the target information. In some examples, determining the drilling information includes detecting a drilling event. Example drilling events include penetration of a gas zone by the drill bit, a change in a geological property of a subterranean formation, operation of a component of the drill bit assembly, etc. In some examples, the drilling information includes, a condition of the target (e.g., worn, functioning properly, etc.), a position of the target, a state of the target (e.g., stationary or moving, open or closed, etc.), and/or other drilling information. In some examples, the drilling information includes a characterization of one or more fluids.

At block 712, at least one of the target information or the drilling information, or both, is wirelessly communicated uphole toward a surface of Earth. By processing the images downhole, the target information and/or the drilling information may be communicated to the surface of Earth in real time via a low bandwidth transmitter such as, for example, a mud-pulse telemetry link. For example, the first transceiver 218 may communicate the target information and/or the drilling information to the second transceiver 226 of the downhole tool 206. In some examples, the telemetry link 228 then communicates the target information and/or the drilling information to the surface of Earth. An operator of the drill bit assembly may then use the target information and/or the drilling information to operate a downhole tool (e.g., the downhole tool 206) including the drill bit assembly. The example method 700 then returns to block 702.

Figure 8:
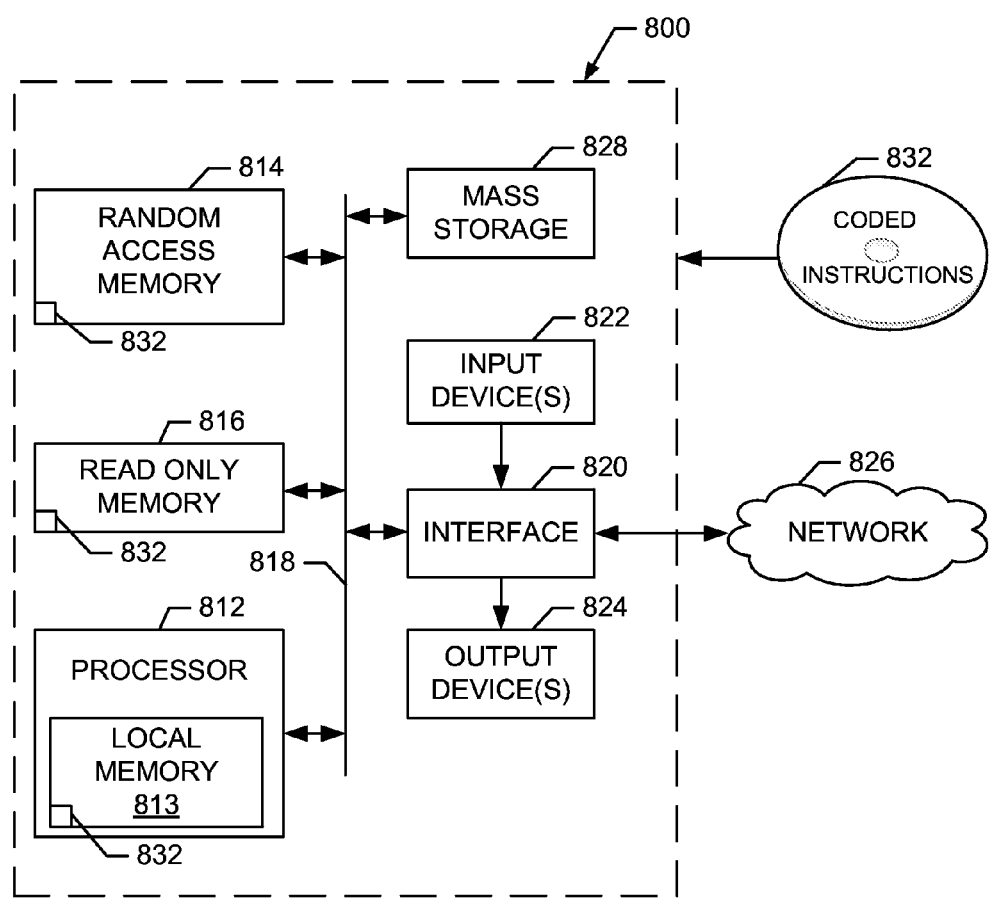
FIG. 8 illustrates an example processor platform that may be used and/or programmed to implement at least some of the example methods and apparatus disclosed herein.

FIG. 8 is a block diagram of an example processor platform 800 capable of executing the example method 700 of FIG. 7 to implement the example imaging system 211 of FIGS. 2-3, the example imaging system 401 of FIG. 4, and/or the example imaging system 501 if FIG. 5. The processor platform 800 can be, for example, a controller, a special-purpose computing device, a mobile device or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

In some examples, one or more output devices 824 are also connected to the interface circuit 820 of the illustrated example.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), coaxial cable, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 to implement the method(s) of FIG. 7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture enable real time communication of drilling information while drilling a borehole. Some examples disclosed herein employ an imaging system having an image sensor that captures images at a high frame rate. In some examples, the images are processed downhole to reduce, minimize and/or alleviate effects of motion parallax such as blurring. By employing image processing, the examples disclosed herein determine diverse types of drilling information such as characteristics of a subterranean formation, characterizations of downhole fluids, conditions and/or states of components of a drill bit assembly, and/or other drilling information.

Although only a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. An apparatus, comprising:
a drill bit assembly;
an image sensor disposed in the drill bit assembly;
an image conduit disposed in the drill bit assembly, wherein the image conduit comprises a first portion for conveying images from an end of the image conduit having a field-of-view to the image sensor and a second portion for conveying light to illuminate the field-of-view;
and
an image processor disposed in the drill bit assembly, the image processor to process illuminated images acquired by the image sensor wherein the image processor combines a plurality of the illuminated images to reduce noise and to iteratively optimize a system of equations for motion and then depth of a target in the field-of-view to reduce motion parallax.

2. The apparatus of claim 1, further comprising a wireless transceiver disposed in the drill bit assembly to wirelessly communicate with a downhole tool operatively coupled to the drill bit assembly.

3. The apparatus of claim 1, wherein the drill bit assembly comprises a port to project flushing fluid.

4. The apparatus of claim 1, wherein the image sensor is a video camera.

5. The apparatus of claim 1, wherein the image conduit is to direct the from a drill bit end of the drill bit assembly to the image sensor.

6. The apparatus of claim 1, comprising a second image conduit is to direct a second image from a side of the drill bit assembly to the image sensor.

7. The apparatus of claim 1, wherein the second image conduit is disposed between the image sensor and a component of the drill bit assembly.

8. A method, comprising:
illuminating a field-of-view that comprises a target;
directing illuminated images of the target through a portion of a drill bit assembly from a first end of an image conduit in optical communication with the target located externally of the drill bit assembly to a second end of the first image conduit in optical communication with an image sensor disposed at a separate location within the drill bit assembly;
capturing the illuminated images via the image sensor disposed inside the drill bit assembly; and
processing the captured images wherein the processing comprises combining a plurality of the captured images to reduce noise and to iteratively optimize a system of equations for motion and then depth of a target in the field-of-view to reduce motion parallax.

9. The method of claim 8, comprising detecting a drilling event based at least in part on the motion and depth of the target.

10. The method of claim 8, further comprising wirelessly communicating the drilling information from the drill bit assembly to a surface of Earth.

11. The method of claim 8, further comprising flushing an area adjacent the drill bit assembly with flushing fluid.

12. The method of claim 8, wherein the images comprise at least one of formation fluid or a portion of a subterranean formation when a drill bit of the drill bit assembly is at least one of rotating or vibrating.

13. An apparatus, comprising:
a drill bit assembly operatively coupled to a downhole tool, the drill bit assembly including a drill bit, an image conduit, a light source, an image sensor and an image processor, the image conduit extending through the drill bit to an end that comprises a field-of-view illuminated by the light source, wherein the image sensor is to capture illuminated images of a target via the image conduit, and the image processor is to combine a plurality of the images to reduce noise and to iteratively optimize a system of equations for motion and then depth of a target in the field-of-view to reduce motion parallax.

14. The apparatus of claim 13, wherein the image sensor is to capture the illuminated images at a frame rate of about one thousand frames per second.

* * * * *